United States Patent Office 3,259,588
Patented July 5, 1966

3,259,588
REACTIVATION OF THERMACTIVATED
CATALYST
Phillip D. Harvey and Jack W. Unverferth, Walnut Creek, Calif., assignors to Chevron Research Company, a corporation of Delaware
No Drawing. Filed Aug. 21, 1963, Ser. No. 303,667
7 Claims. (Cl. 252—411)

The present invention relates to the activation of hydrogenative conversion catalysts and pertains more especially to the reactivation of catalysts which have become deactivated after long exposure to hydrogenative conversion conditions. The invention concerns the preparation of improved low fouling, activated hydrocracking catalyst compositions. The invention more particularly concerns the restoration or rejuvenation of hydrocracking catalysts which, after long exposure to hydrocarbon feeds under hydrocracking conditions have become deactivated and so changed that conventional removal of the accumulated carbonaceous deposits does not produce a catalyst with the desired percentage of the original hydrocracking activity. The invention also relates to a hydrocracking process for converting petroleum distillates and residua to various valuable products for sustained periods of on-stream operation and wherein the hydrocracking operation is discontinued and the catalyst rejuvenated to increase substantially the useful life of the catalyst.

In the so-called non-regenerative catalytic processes, the catalyst remains active for long periods of time and does not need to be periodically regenerated every few minutes or hours. However, the catalysts used in such non-regenerative processes gradually become deactivated after many days on stream and need to be replaced or preferably reactivated in situ. For example, as shown in Scott Patent No. 2,944,006, hydrocarbon feeds can be hydrocracked to valuable products for long on-stream periods at reasonable operating conditions without intolerable catalyst fouling rates with a sulfide of nickel or cobalt disposed on an active siliceous cracking catalyst support, provided the hydrocarbon feed has a low nitrogen content. However, it has been found that such catalysts after long exposure to hydrocarbon feed under hydrocracking conditions become deactivated with the nickel or cobalt component so changed that conventional removal of the accumulated carbonaceous deposits does not result in the catalyst regaining an adequate percentage (i.e., over 35%, preferably over 50%) of its original hydrocracking activity. While it has been proposed that deactivated hydrocracking catalysts can be regenerated by combustion of the carbonaceous deposits, such methods are usually found to restore only a small percentage of the fresh catalyst activity that has been lost during the long on-stream periods of operation under hydrocracking conditions.

In hydrocracking operations, a catalyst having low fouling rates is highly advantageous since such catalyst can be kept on-stream and used without replacement or regeneration for long periods with a minimum increase in the operating temperature.

Also, it is usually desirable that hydrocracking catalysts have a high activity so that the temperatures and other reaction conditions can be as mild as possible consistent with good rates of conversion. As disclosed in copending application Serial No. 794,109, filed February 18, 1959, one method of activating hydrocracking catalysts composed of an active siliceous cracking support having disposed thereon nickel, cobalt or the oxides or sulfides thereof as the hydrogenating component, is to subject the catalysts to a controlled heating or thermactivation. In such thermactivation procedure, a relatively dry non-reducing gas such as air, nitrogen or carbon dioxide is passed through the mass of particulate catalyst with the cobalt or nickel present therein in the form of oxides or of compounds decomposable thereto on heating, at a rate which is preferably at least 10 cubic feet per hour per cubic foot of catalyst at temperatures ranging from about 1200 to 1600° F. for times ranging from about 0.25 to 48 hours sufficient to give a substantial increase in activity, with the lower temperatures being used with the longer times and vice versa. However, it has been found that the hydrocracking activity of such a thermactivated catalyst is substantially reduced and the hydrocracking activity of other active freshly prepared hydrocracking catalysts is reduced to a lesser extent, if the catalysts are contacted with an appreciable amount of an aqueous liquid treating agent or are otherwise exposed to substantial amounts of moisture.

The method of the present invention provides a process for preparing improved low fouling, activated hydrocracking catalysts particularly from hydrocracking catalysts which have become deactivated by long on-stream exposure to hydrocracking conditions. By this method, spent hydrocracking catalysts can be converted to catalysts having a fouling rate lower than the freshly prepared catalyst. The method also gives rejuvenated catalysts which have hydrocracking activities substantially equivalent to, or greater than that of the freshly prepared catalyst.

The procedure of the present invention finds special application to deactivated hydrocracking catalyst and hence will be described more fully in connection with the rejuvenation of such hydrocracking catalysts. In the treatment of deactivated catalyst, the process of the present invention has particular and preferred application to thermactivated hydrocracking catalysts which have become deactivated during long exposure to hydrocarbon feed under hydrocracking conditions. Surprisingly, thermactivated hydrocracking catalysts which have become deactivated during use can be rejuvenated to substantially the original thermactivated activity by the aqueous treatment of the present invention without repeating the thermactivation. This is indeed an unexpected result since, as indicated above, thermactivated catalysts as freshly prepared before contact with hydrocarbons lose their thermactivation activity by any aqueous treatment.

Further, it is highly desirable to be able to restore catalyst activity by treatments conducted in situ without having to remove the large amounts of catalysts normally contained in fixed bed reactors. By the present method, catalyst restoration can be conducted in situ and such operation can be carried out without a materials corrosion problem.

In one preferred embodiment of the present invention, the process is used to rejuvenate, and to produce a hydrocracking catalyst of improved low fouling rate from, a supported hydrogenating catalyst which before long exposure to hydrocarbon feed under hydrogenative conversion conditions is an active catalyst composed of at least one hydrogenating metal component selected from Groups VI and VIII metals and components thereof disposed on a high surface area support but which catalyst after long exposure to hydrocarbon feed under hydrogenative conversion conditions has accumulated carbonaceous deposits and has become deactivated with the hydrogenative metal component so changed that conventional removal of the accumulated carbonaceous deposit does not result in reactivation of a substantial percentage of the original hydrogenative conversion activity. Preferably the catalysts are those in which the hydrogenating metal component is selected from Group VIII metals and compounds thereof exclusive of noble metals and compounds thereof. In this process the deactivated catalyst before removal of the oily carbonaceous deposit is impregnated with an aqueous solution of salts of said hydrogenating metal component, preferably salts which are decomposable below 1100° F.

The concentration of the hydrogenating metal salt in the aqueous solution and the quantity of the latter used to impregnate the catalyst composition are such that the desired concentration of the hydrogenating metal component is established on the cracking support. To prepare an improved low fouling catalyst the amount of added hydrogenating metal salt, calculated on a metal basis, is at least 1% of the catalyst composition and may range upwards to 15 or 20% or more. However, where it is desired to minimize hydrogenative saturation of aromatic components in the feed to a hydrocracking process using the rejuvenated catalyst, the amount of hydrogenating metal component added in the impregnation preferably is less than 5% and more especially in the range of 1 to 3% calculated on a metal basis. Hydrocracking catalyst rejuvenated by the process of the present invention and containing more than the preferred amount of added hydrogenating metal basis. Hydrocracking catalyst rejuvenated by the process of the present invention and containing more than the preferred amount of added hydrogenating metal component exhibit an initial higher activity towards saturation of aromatic compounds than do freshly prepared hydrocracking catalysts having the same content of hydrogenating metal component.

Representative salts which may be employed to effect the impregnation of the catalyst composition are the chlorides, nitrates and acetates although other heat-decomposable salts may be employed as desired including various metallo-organic compositions such as the chelates.

After impregnation of the catalyst composition with the aqueous solution of hydrogenating metal salts, the treated catalyst is dried and heated to decompose the salts and to remove the carbonaceous deposits. The heat treatment is preferably conducted in an atmosphere such that the salts of the hydrogenating metal are converted to the oxide form. For this purpose, a dry combustion supporting gas such as a nitrogen-air mixture is used. Other oxygen-containing mixtures such as air plus carbon dioxide or other inert gas may be used. Preferably, at least during the initial portion of the burn, the catalyst temperature is controlled between 450 and 750° F., usually by employing a dilute oxygen-containing gas such as ¼–½ percent oxygen in admixture with inert gas at the start of treatment. Such heat treatment in an oxidizing atmosphere is continued until burning substantially ceases and the salts have been substantially completely decomposed and converted to the oxides. Usually, a final burn with the oxygen concentration increased and the temperature of the dry combustion supporting gas increased up to 950° to 1000° F. is carried out until no further burning is observed. For in situ rejuvenation of hydrocracking catalyst, the temperature is kept below 1000° F. Though good results are obtained at near atmospheric pressure, to reduce the time required the oxidations are preferably carried out with an elevated pressure of above 200 p.s.i.g., such as above 500 p.s.i.g. up to 10,000 p.s.i.g. In any event, the temperature is kept below that at which there is an appreciable loss of the surface area of the catalyst.

The dry combustion supporting gas is preferably free of sulfur oxides and may be any suitable mixture of oxygen with an inert carrier gas. Examples are nitrogen-air flue gas air mixtures. Where the gas is recycled, it is preferred to remove combustion products such as $SO_2$ and $H_2O$ to prevent their buildup in the circulating gas. For this purpose the gas may be scrubbed with a caustic solution or may be subjected to catalytic or adsorptive contacting.

By "dry" combustion supporting gas is meant that the molar concentration of water vapor is relatively low, that is, at least below about 6 mol percent and preferably below 1 mol percent.

Following the oxidation step, the catalyst may be variously treated prior to use or can be used directly in hydrogenative conversion operations. Such treatments can include thermactivation, reduction and sulfiding. Where the catalyst is to be placed in a hydrocracking operation, the catalyst can be used without further treatment, particularly with sulfur-containing feeds which would sulfide the catalyst during start up to the desired sulfide state for the hydrogenating metal component such as nickel.

A preferred final step in preparing the catalyst for reuse in hydrocracking operations is to convert the hydrogenating metal component to the sulfide. This may be accomplished in any of the several known ways such as by contacting the catalyst with a sulfiding agent such as $H_2S$, mixtures of hydrogen and $H_2S$ and mixtures of hydrogen and organic sulfur compounds reducible to $H_2S$ at the conditions employed. Generally, the catalyst temperature during sulfiding is controlled below 850° F. and preferably below 750° F. The best results are obtained by contacting the oxidized catalyst with a mixture of hydrogen and vaporized organic sulfur compounds such as dimethyl disulfide, isopropyl mercaptan or carbon disulfide at temperatures in the range of 450–650° F. An excess of sulfiding agent is usually employed to insure substantially complete conversion of the oxide of the hydrogenating metal component to the sulfide.

By the above-described procedure, deactivated hydrogenative conversion catalysts can be rejuvenated to substantially original fresh activity or so closely approaching such activity that the overall useful life of the catalyst is greatly extended. Also important is the low fouling rate obtained by the process. As shown in the examples below, the fouling rate of a hydrocracking catalyst rejuvenated by the process of the present invention is lower, i.e., the catalyst lasts longer than the freshly prepared catalyst.

When the present process is applied to the preferred hydrocracking catalysts, particularly to such catalysts with nickel or cobalt hydrogenating metal components, the economic application of the hydrocracking is greatly expanded. Hence, the present process is especially desirable to use the rejuvenation step in a hydrocracking process. In such hydrocracking process, hydrocarbon stocks including hydrocarbon distillates boiling from about 300° to 1100° F., hydrocarbon residuals boiling above about 1050° F., and mixtures thereof are hydrocracked to more valuable lower boiling products by contacting such feeds in a hydrocracking zone with a catalyst comprising the hydrogenating-dehydrogenating component on an active, acid, cracking support at a temperature from 450° to 900° F., preferably for a major portion of the on-stream period below 750° F., a space velocity of from about 0.2 to 5.0 or more, and a hydrogen partial pressure of at least 350 p.s.i.g. with at least 1000 s.c.f. of hydrogen per barrel of feed, there being consumed in the hydrocracking zone at least 500 s.c.f. of hydrogen per barrel of feed converted to products boiling below the initial boiling point of said feed. Suitable hydrogenating-dehydrogenating components are the metals, and compounds of the metals, of Groups VI and VIII of the Periodic Table. Generally, the hydrogenating component is preferably from Group VIII and usually other than noble metals and their compounds. Especially preferred are the sulfides of nickel and cobalt. Combinations of metal sulfides with one or more metals and compounds thereof from Groups VIII, VI–B and I–B of the Periodic Table may be used. The amount of the hydrogenating component may be varied from 0.5 to 35% or more, more desirably in the range of 4 to 20%, based on the weight of the entire catalyst composition. The remaining, or cracking, component of the hydrocracking catalyst may be selected from the various siliceous cracking catalysts, such as the composites of silica-alumina, silica-magnesia, silica-alumina-zirconia, silica-zirconia-titania and synthetic metal aluminum silicates (including synthetic chabazites normally referred to as "molecular sieves") which have been found to impart the necessary degree of cracking activity to the catalyst. In this connection the term "high cracking activity" is employed herein to designate those catalysts having activity equivalent to a Cat. A value of at least 25 or a quinoline number of at least 20 (J. Am. Chem. Society, 72, 1554 (1950)). The hydrocracking conversion for maximum gasoline production is normally preceded by a treatment to remove excess nitrogen content from the hydrocarbon charging stocks. Preferably, denitrification is accomplished by contacting said feed with hydrogen in a suitable catalyst under hydrofining conditions, such as a space velocity of 0.2 to 10 LHSV, a pressure of 500–5000 p.s.i.g. and a temperature of 500–850° F.

The activities of catalysts can be compared in terms of their ability to convert a feed stock to lower boiling products. By determining the relative conversion under the same operating conditions for fresh and treated catalysts the activity of a rejuvenated catalyst can be compared to that of fresh catalyst. One way to make such comparison is to carry out comparative hydrocracking tests with a selected standard and readily obtainable hydrocarbon feed stock. The fouling rate, i.e., the rate at which the temperature has to be raised to maintain the conversion constant is determined by operating at selected standard conditions to obtain a constant conversion by varying the temperature and continuing the run for an adequate period, usually for 250–350 hours. The starting temperatures, determined by extrapolating back to zero time after the unit has run for sufficient time to attain steady operation, usually after about 100 hours, serve as a basis for comparing the catalyst activities. The lower the starting temperature the longer the catalyst can be used at constant conversion before the temperature needs to be raised above the point where the selectivity and nature of the products changes substantially. Usually this temperature at which the run is terminated is about 700° F. when using the preferred catalysts and process of Scott Patent No. 2,944,006.

In determining the fouling rate, the standard feed test stock is passed through the test catalyst in a continuous feed pilot unit at a liquid hourly space velocity of 1.5, 1200 p.s.i., a once-through hydrogen rate of 6500 s.c.f. per barrel of feed and a constant conversion of 60% maintained by adjusting the temperature. The hydrogen consumption is about 900 s.c.f. of hydrogen per barrel.

The conversion activity is also conveniently measured with the same standard feed test stock by determining the change in gravity in ° API, between the feed and the product, which change is referred to as an "activity index." In this test, the conditions are maintained at 570° F. and 1200 p.s.i., a liquid hourly space velocity of feed passing through the catalyst of 2 and a once-through hydrogen rate of 12,000 s.c.f. per barrel of feed. The activity is determined from a product obtained after running the test for about 50 hours, which period screens out catalysts with shortlived activity. This test is conducted in a 6-tube continuous feed unit with a standard catalyst in one of the tubes for comparison purposes.

The standard feed stock employed in these tests for fouling rates and activity indices is a catalytic cycle oil obtained as a distillate fraction from a fluid type catalytic cracking unit, the fraction being one containing essentially equal proportions of aromatics and of paraffins plus naphthenes, which distillate is hydrofined to produce a stock having the following inspections:

| | |
|---|---:|
| Gravity, ° API | 29.2 |
| Aniline point, ° F. | 100.2 |
| Nitrogen (basic), p.p.m. | 0.3 |
| Aromatics, vol. percent | 47 |
| Naphthenes, vol. percent | 37 |
| Paraffins, vol. percent | 19 |
| ASTM distillation (D–158): | |
| Start | 362 |
| 5% | 441 |
| 10 | 453 |
| 30 | 481 |
| 50 | 500 |
| 70 | 523 |
| 90 | 560 |
| 95 | 577 |
| End point | 624 |

In the following more detailed description, the invention is described for illustrative purposes in terms of a hydrocracking catalyst composed of a nickel sulfide as the hydrogenating metal component disposed on a siliceous cracking support such as silica-alumina. The rejuvenation method of the present invention is employed following an extended on-stream period of at least 500 to 750 hours, usually over 1000 hours, up to several thousand hours, e.g., 4000 hours, under hydrocracking conditions. After such rejuvenation to an activity approaching its original activity, the catalyst is placed back in hydrocracking service for subsequent cycles of extended on-stream periods of at least 500 hours, generally over 750 hours and usually over 1000 hours.

To illustrate the process of the present invention, tests were carried out on catalysts which were prepared by the procedure of the following example.

EXAMPLE 1

A catalyst containing nickel sulfide on silica-alumina was prepared by impregnating silica-alumina particles with a solution of nickel nitrate in a concentration sufficient to provide the catalyst with 6 weight percent nickel on a dry basis. The silica-alumina particles employed contained about 90% silica and had a Cat. A value in excess of 40 before being impregnated with the hydrogenating metal component. After impregnation and drying, the catalyst was thermactivated by contact for 2.2 hours with a stream of hot air at an average temperature of about 1425° F. Thereafter, the catalyst was sulfided and used for hydrocracking in a four-bed reactor for several thousand hours on a hydrocarbon feed stock having a total nitrogen content of less than 1 p.p.m. The hydrocracking operation was discontinued when the temperature necessary to maintain hydrocracking conversion of the hydrocarbons at 60% had risen to approximately 750° F., indicating that the catalyst was spent. Samples of spent catalyst obtained from the various beds in the reactor were found to be coated with carbonaceous deposits. Air blowing the spent catalysts by conventional procedures to remove the carbonaceous deposits produces catalysts having only about 20–40% of fresh catalyst activity. Particularly poor results are obtained with the catalysts from the first bed, where the hydrocarbon feed entered.

EXAMPLE 2

A series of catalysts were tested in accordance with the "activity index" procedure described hereinabove. In this series, catalysts were prepared from spent catalysts as described in Example 1, catalysts A, B and C being from the third bed and catalysts D and E being from the fourth bed. These catalysts were subsequently treated as follows: Catalysts A, a spent catalyst containing about 6% carbonaceous deposits, calculated as carbon, was impregnated with approximately 1.2 molar nickel nitrate solution at a ratio of 75 ml. of solution per 100 ml. of spent catalyst at room temperature for 4 hours. Thereafter the catalyst was dried at 250° F. for 20 hours and then heated in flowing dry nitrogen-air, first at 625° F. with dilute oxygen (i.e., 0.5 mol percent) and finally at 1000° F. with 4% oxygen for a total of approximately 24 hours. Catalyst B was the same as Catalyst A except that more nickel, as indicated in the table below, was added by the impregnation. Catalyst C was the same as Catalyst B except that the catalyst was thermactivated by contact for 2.2 hours with a stream of hot air at an average temperature of about 1425° F. Catalysts D and E were treated like Catalysts B and C, respectively. The activity of the resulting catalysts after being converted to the sulfide form were compared on the basis of activity index to a standard freshly prepared catalyst. Surface areas were also obtained as an indication of whether any damage was sustained by the support as a result of the treatment. The surface areas were measured by the nitrogen adsorption method of Brunauer, Emmett and Teller as described in J. Am. Chem. Society, 60, 309 (1938). Also given are the aniline points of the products.

Table I

| Catalyst | Added Ni Content (Percent By Wt. Dry Basis) | Surface Area (m.$^2$ g.) | Activity (Percent of Standard) | Aniline Point |
| --- | --- | --- | --- | --- |
| A | 2 | 323 | 95 | 118 |
| B | 5 | 321 | 111 | 125 |
| C | 5 | 294 | 118 | 122 |
| D | 5 | 307 | 103 | 123 |
| E | 5 | 286 | 120 | 121 |

The above results indicate that the process of the present invention gives a rejuvenated catalyst at least substantially equal to freshly prepared catalyst. Catalysts B, C and E are considerably more active than fresh catalyst. It will be noted that Catalysts A, B and D were heated only to 1000° F., i.e., they were not thermactivated again. Nevertheless, these catalysts were at least as active as freshly prepared catalysts which had been thermactivated. Further, the above results can be compared to the activity of spent catalysts which only have had the carbonaceous deposits removed by the same heat treatment used with the above catalysts. Such treatment applied to the spent catalysts used in preparing the above catalysts results in a catalyst having no more than about 25% of the activity of fresh catalysts. The aniline points illustrate that the catalysts rejuvenated by the present method have an aromatic saturation activity which increases with increased nickel content. Hence, where it is desired to retain aromatic rings, it is preferred to keep the added metal content to below 3 wt. percent on a nickel equivalent basis. With the freshly prepared standard catalyst, the aniline point of the product is about 114.

EXAMPLE 3

Another series of tests were run to determine the fouling rates and starting temperatures for treated catalyst in accordance with the procedure described hereinabove. In this series, Catalyst F is a freshly prepared catalyst as described in Example 1. Catalysts G-J were prepared from spent catalyst samples from the same (third) bed, as described in Example 1. For Catalyst G, the spent catalyst containing about 6% carbonaceous deposits, calculated as carbon, was impregnated with approximately 2.5 molar nickel nitrate solution at a ratio of 75 ml. of solution per 100 ml. of spent catalyst at room temperature for 4 hours. Thereafter the catalyst was treated as described for Catalyst A in Example 2. Catalyst H was the same as Catalyst G except that less nickel was added during the impregnation. Catalyst J was prepared by first removing the carbonaceous deposits in accordance with the dry nitrogen-air heat treatment described for Catalyst A in Example 2, then impregnating the decarbonized catalyst with the same amount of nickel nitrate as for Catalyst G, and thereafter drying the catalyst and decomposing the nitrate by heating in flowing air with a final temperature of 1200° F. Catalyst K was prepared by only removing the carbonaceous deposits in the same manner as used in the first step in the preparation of Catalyst J. Catalyst L was a fresh catalyst prepared in the same manner as Catalyst F except that two impregnations were used to bring the nickel content to about 12 weight percent. The results from testing these catalysts after converting them to the sulfide form are given in Table II:

Table II

| Catalyst | Added Metal (Percent By Wt. On Dry Basis) | Starting Temperature (° F.) | Fouling Rate (° F./Hr.) |
| --- | --- | --- | --- |
| F-Fresh Catalyst | (6% total) | 570-575 | 0.12-0.14 |
| G | 5 | 572 | 0.065 |
| H | 2 | 587 | 0.11 |
| J | 5 | 596 | 0.094 |
| K-Air Regeneration Only | | 625 | 0.25 |
| L-Fresh Catalyst | (12% total) | 584 | 0.06 |

The above results illustrate that spent catalysts rejuvenated in accordance with the present procedure surprisingly have improved fouling rates, i.e., lower than the fouling rate for fresh catalyst. Such improvement is very important since a catalyst having one-half the fouling rate of a standard catalyst will have a useful life twice that of the standard catalyst. In other words, such an improved catalyst could be used for an on-stream period of 5000 hours as compared to 2500 hours for the standard catalyst before the temperature reached the point where the catalyst needed to be rejuvenated.

The process of the present invention can be used to obtain improved low fouling rate catalysts. Such process rejuvenates deactivated hydrocracking to an activity substantially equal to or higher than that of fresh catalyst. Both these effects greatly extend the catalyst life and hence contribute significantly to the economic value of the low temperature hydrocracking process. Further, the process can be carried out in situ at reasonable temperatures and without incurring excessive corrosion of usual reactors.

We claim:

1. In the process of reactivating a hydrocracking catalyst which, before exposure to hydrocarbon oil, is a high surface area catalyst composition composed of an active cracking support having disposed thereon a hydrogenating metal component selected from the group consisting of Group VI and Group VIII metals and compounds thereof other than noble metals and compounds thereof, and which catalyst, before exposure to hydrocarbon oil, has been activated by heating in a non-reducing atmosphere at 1200–1500° F. for 0.25–48 hours sufficient to activate the composite catalyst, but which catalyst, after being contacted with an oil under conditions to deposit a carbonaceous coating thereon, has become deactivated, the improvement which comprises impregnating the resultant coated catalyst composition with an aqueous solution of at least one hydrogenating metal salt, said hydrogenating metal being selected from Groups VI and VIII of the Periodic Table other than noble metals and the amount of said salt being sufficient to add at least one percent of said metal salt, calculated on a metal basis, to the catalyst composition, drying said impregnated catalyst composition, and heating the catalyst at temperatures below about 1100° F. to decompose the hydrogenating metal salts and to remove the carbonaceous deposits.

2. The process of claim 1 wherein the hydrogenating metal is nickel.

3. The process of claim 1 wherein said carbonaceous coating is formed during hydrocracking operations with said catalyst composition.

4. In the process of reactivating a supported hydrocracking catalyst which, before long exposure to hydrocarbon feed under hydrocracking conditions, is an active hydrocracking catalyst composed of at least nickel sulfide as a hydrogenating metal component deposited on a high surface area active cracking support and which catalyst before conversion of the hydrogenating metal component to the sulfide has been activated by heating in air at 1200–1500° F. for 0.25–48 hours sufficient to activate the hydrocracking catalyst, but which catalyst, after long exposure to hydrocarbon feed under hydrocracking conditions, has accumulated carbonaceous deposits and has become deactivated with the nickel hydrogenating metal component so changed that conventional removal of the carbonaceous deposits does not result in recovery of a substantial proportion of the original hydrocracking activity, the improvement which comprises the steps of impregnating said deactivated catalyst before removal of said carbonaceous deposits with an aqueous solution of at least one hydrogenating metal salt, said hydrogenating metal being selected from Groups VI and VIII of the Periodic Table, the amount of said salt being sufficient to add at least one percent of said metal salt, calculated on a metal basis, to the catalyst composition and thereafter drying said impregnated catalyst and decomposing the hydrogenating metal salts to yield a hydrocracking catalyst composition having an improved low fouling rate.

5. The process of claim 4 wherein the hydrogenating metal salts in said impregnated metal catalyst are decomposed at temperatures below about 1100° F., which results in a reactivated catalyst having a hydrocracking activity substantially the same as a freshly prepared catalyst activated by the above heat treatment.

6. The process of claim 4 wherein the metal salt is selected from Group VIII metals, exclusive of the noble metals.

7. The process of claim 4 wherein the amount of hydrogenating metal salt added in the impregnation step is between 1 and 3% by weight, calculated as metal, whereby the aromatic saturation activity is minimized while obtaining high hydrocracking activity.

References Cited by the Examiner
UNITED STATES PATENTS

| | | | |
|---|---|---|---|
| 2,330,174 | 9/1943 | Hachmuth | 252—412 |
| 2,862,890 | 12/1958 | Daugherty | 252—412 |

OSCAR R. VERTIZ, *Primary Examiner.*

R. M. DAVIDSON, H. S. MILLER, *Assistant Examiners.*